United States Patent
Denischenko et al.

(10) Patent No.: US 10,712,951 B2
(45) Date of Patent: Jul. 14, 2020

(54) SYSTEM AND METHOD FOR BACKING UP SOCIAL NETWORK DATA

(71) Applicant: Acronis International GmbH, Schaffhausen (CH)

(72) Inventors: Nikolay Denischenko, Moscow (RU); Nikolay Grebennikov, Moscow (RU); Mark Shmulevich, Moscow (RU); Stanislav Protasov, Moscow (RU); Serguei M. Beloussov, Costa Del Sol (SG)

(73) Assignee: Acronis International GmbH, Schaffhausen (CH)

( * ) Notice: Subject to any disclaimer, the term of this patent is extended or adjusted under 35 U.S.C. 154(b) by 175 days.

(21) Appl. No.: 15/696,612

(22) Filed: Sep. 6, 2017

(65) Prior Publication Data
US 2018/0067664 A1    Mar. 8, 2018

Related U.S. Application Data

(60) Provisional application No. 62/383,686, filed on Sep. 6, 2016.

(51) Int. Cl.
*G06F 3/06* (2006.01)
*G06F 11/14* (2006.01)

(52) U.S. Cl.
CPC ............ *G06F 3/0619* (2013.01); *G06F 3/065* (2013.01); *G06F 3/067* (2013.01); *G06F 3/0653* (2013.01); *G06F 11/14* (2013.01)

(58) Field of Classification Search
CPC ....... G06F 3/065; G06F 3/0619; G06F 3/0653
USPC .......................................................... 726/26
See application file for complete search history.

(56) References Cited

U.S. PATENT DOCUMENTS

| | | | | |
|---|---|---|---|---|
| 8,676,759 | B1* | 3/2014 | Zhu .................. | G06F 11/1451 707/638 |
| 9,430,491 | B2* | 8/2016 | Vibhor ............... | H04L 29/0854 |
| 9,635,041 | B1* | 4/2017 | Warman .............. | H04L 41/50 |
| 2009/0144341 | A1* | 6/2009 | Hauck ............... | G06F 11/1464 |
| 2010/0269164 | A1* | 10/2010 | Sosnosky ........... | H04L 67/1095 726/7 |
| 2014/0201141 | A1* | 7/2014 | Vibhor ............... | H04L 29/0854 707/622 |

(Continued)

*Primary Examiner* — Shin-Hon (Eric) Chen
*Assistant Examiner* — Dereena T Cattungal
(74) *Attorney, Agent, or Firm* — Arent Fox LLP; Michael Fainberg

(57) ABSTRACT

Disclosed are methods, systems and computer program products for backing up user data from a social network account. An exemplary general method includes the steps of obtaining access to a user account on a social network, by a social network application; determining, by the social network application, one or more restrictions on external requests for data imposed by the social network; generating, by a backup agent in communication with the social network application, an algorithm for requesting data from the user account based upon the one or more restrictions on external requests for data; requesting user data from the user account, by the social network application, using the algorithm; receiving the user data from the user account, by the social network application; transmitting the received user data from the social network application to the backup agent; and archiving the received user data, by the backup agent.

20 Claims, 5 Drawing Sheets

(56) References Cited

U.S. PATENT DOCUMENTS

| | | | |
|---|---|---|---|
| 2015/0154002 A1* | 6/2015 | Weinstein | G06F 3/167 |
| | | | 715/728 |
| 2016/0232336 A1* | 8/2016 | Pitschel | G06F 21/305 |
| 2017/0142191 A1* | 5/2017 | Caldwell | H04L 63/083 |
| 2018/0033072 A1* | 2/2018 | Karthikeyan | G06Q 30/0633 |

* cited by examiner

SYSTEM AND METHOD FOR BACKING UP SOCIAL NETWORK DATA

CROSS-REFERENCE TO RELATED APPLICATION

The application claims priority to U.S. Provisional Patent Application No. 62/383,686, which was filed on Sep. 6, 2016, the contents of which is incorporated herein by reference.

TECHNICAL FIELD

The disclosure relates generally to the field of computer science, and more specifically to the systems and methods for backing up user data stored on social networks.

BACKGROUND

Social networks have emerged as an increasingly popular platform for today's internet users. Contemporary social networking sites allow users to share various forms of user-generated content, including notes, photos, videos, event-related information and discussions between individual or groups of users. Moreover, social networks contain extensive amounts of personal information and relationships between individual users, in many cases recording changes over time that can extend back for years, if not all the way through to the initial creation of a user account. As such, modern social networks store a huge amount of user-generated data.

As a general rule, data security and integrity is provided by the social network itself, which operates as a cloud-like service. Major social networks such as Facebook, Instagram, Pinterest, LinkedIn, FourSquare and others typically allow users to store data in the form of a chronicle of events (e.g., as a timeline), or in the form of various kinds of data collections (e.g., as a gallery). Thus, user data is often structured in an organized manner specific to each social network. This organized formatting allows users to easily traverse the data, for example by scrolling through a timeline or browsing collections. However, social network providers typically few if any authorized options for users looking to copy or duplicate data associated with their account(s).

Social networks often implement these restrictive policies by imposing limits on a user's ability to export their data directly through the social network interface. Similarly, social networks commonly limit external applications from accessing user data (e.g., by restricting the number of requests that may be received by an external application within a given timeframe). Popular social networks have a vested interest in restricting the transfer of user data, as a liberal transfer policy may potentially allow users to easily leave a social network and reintegrate the data into a new account on a competitor's social network.

Notwithstanding the social network providers' interest in restricting the transfer of user data, there are various legitimate reasons why a user may have a need to backup data stored on or otherwise associated with their social network account. For example, social networks may block user accounts, temporarily or permanently, for various reasons (e.g., for posting content in violation of the social network's policies). There is also the ever present threat that a user's account will be compromised by hackers, resulting in user data being lost, stolen or damaged. Software packages exist which allow a user to backup data from a social network account. However, current solutions are inadequate, as they fail to provide efficient and secure methods of backing up data.

Given these concerns and the lack of suitable alternatives, there exists a clear need in the art for efficient methods of backing up user data from social network accounts.

SUMMARY

Disclosed are methods, systems and computer program products for backing up user data from a social network account. Select aspects of the disclosure address the shortcomings in the art identified above, as well as other previously unmet needs which will become apparent in view of the description provided herein.

In a first general aspect, a method according to the disclosure may include the steps of obtaining access to a user account on a social network, by a social network application; determining, by the social network application, one or more restrictions on external requests for data imposed by the social network; generating, by a backup agent in communication with the social network application, an algorithm for requesting data from the user account based upon the one or more restrictions on external requests for data; requesting user data from the user account, by the social network application, using the algorithm; receiving the user data from the user account, by the social network application; transmitting at least a portion of the received user data from the social network application to the backup agent; and archiving at least a portion of the received user data, by the backup agent.

In another aspect, the step of archiving the at least a portion of the received user data, by the backup agent, comprises: transmitting a copy of the at least a portion of the received user data, from the backup agent to an online storage comprising a remote data center or a cloud storage.

In another aspect, the social network application is an application integrated into the user account on the social network.

In another aspect, the one or more restrictions on external requests for data comprise at least one of the following: a) a limitation on the number of requests for user data that may be made within a given unit of time; b) a limitation on the type of user data that may be requested; or c) a limitation on requests for user data based upon a privacy level associated with the data.

In another aspect, the method further comprising the following steps: monitoring for changes to the user data, by the social network application, by comparing the data received from the user account against user account data previously received by the social network application; and identifying new or modified user data in the data received from the user account.

In a further aspect, the previously received user account data used for the comparison is selected based upon a preset timeframe parameter.

In a still further aspect, the new or modified user data is transmitted from the social network application to the backup agent and archived by the backup agent.

In a second general aspect, a system for backing up user data from a social network account according to the disclosure may include a processor configured to: obtain access to a user account on a social network, by a social network application; determine, by the social network application, one or more restrictions on external requests for data imposed by the social network; generate, by a backup agent in communication with the social network application, an algorithm for requesting data from the user account based upon the one or more restrictions on external requests for data; request user data from the user account, by the social network application, using the algorithm; receive the user data from the user account, by the social network application; transmit at least a portion of the received user data from the social network application to the backup agent; and archive at least a portion of the received user data, by the backup agent.

In another aspect, the system may include a processor configured to perform the steps of any of the methods disclosed herein.

In a third general aspect, a non-transitory computer readable medium storing computer-executable program instructions for backing up user data from a social network account according to the disclosure may include instructions for carrying out any of the methods disclosed herein.

The above simplified summary of example aspects serves to provide a basic understanding of the invention. This summary is not an extensive overview of all contemplated aspects, and is intended to neither identify key or critical elements of all aspects nor delineate the scope of any or all aspects of the invention. Its sole purpose is to present one or more aspects in a simplified form as a prelude to the more detailed description of the invention that follows. To the accomplishment of the foregoing, the one or more aspects of the invention include the features described and particularly pointed out in the claims.

BRIEF DESCRIPTION OF THE DRAWINGS

The accompanying drawings, which are incorporated into and constitute a part of this specification, illustrate one or more example aspects of the invention and, together with the detailed description, serve to explain their principles and implementations.

DETAILED DESCRIPTION

Figure 1A:
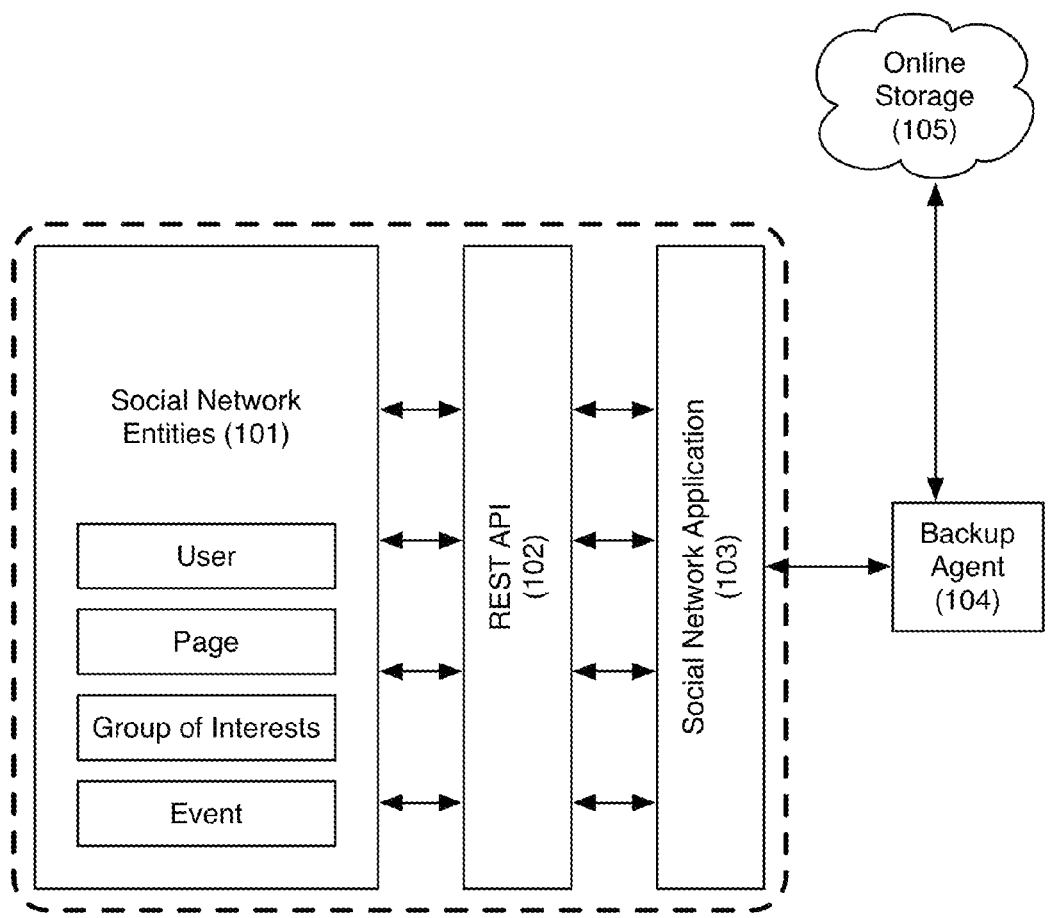
FIG. 1A is a block diagram illustrating exemplary system for backing up user data from a social network account according to the disclosure.

Exemplary aspects of the present invention are described herein in the context of methods, systems, and computer program products for backing up user data from a social network account. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same items.

Social networks are an increasingly popular medium for communication and content creation. Users interested in backing up these communications and content are often limited by restrictions put in place by the social network (e.g., limitations on the number ore frequency of requests that a user or external application can make, size restrictions on downloads, and other policies intended to conserve resources). In view of these limitations, there exists a need for backup applications which allow a user to copy and/or download social network content to generate a local or remote backup copy while maintaining compliant with the restrictions established by a social network. Such networks promote increased efficiency, avoiding the need for users to manually select and archive content. Backup methods which limit the number of requests submitted to a social network are particularly useful given that large social networks may have millions of users (i.e., a large number of concurrent backup requests from even a small percentage of the user base may require a substantial amount of computational or memory resources to process, resulting in a bottleneck). Such methods are also useful for backup archive services for the same reason, as these services are also limited by available hardware and computational resources. As a result, a social network backup application or system may promote efficiency by limiting requests to a social network and/or to a backup service and also in some cases by maintaining a record of items or content that have been archived so as to minimize the amount of data that must be transferred to an archive when performing a periodic or subsequent archiving of content from the same social network user or account. The present disclosure provides various exemplary aspects which address these and other shortcomings in the current art.

Social network content may be generally categorized as two different types of content: "collections" and "objects." Many social networks will typically a represent user's posts or other content (messages, entries, records, photos, publications, etc.) as a feed that is organized chronologically or categorically. Such feeds (or subsets thereof) may be considered a "collection" of posts or content. In essence, each collection may be viewed as a set of identifiers for the user posts/publication. The collections associated with a given user may comprise one or more "objects," e.g., specific user posts or other content. "Objects" may include, but are not limited to, specific media files, pictures, messages, comments, publications, links, etc. within the user's feed. It is understood that objects may also include non-textual comments such as "like" or "dislike" marks, stickers and other visual or interactive content items created by or selected by a user.

FIG. 1A is a block diagram illustrating exemplary system for backing up user data from a social network account according to the disclosure. This block diagram illustrates the connections between the components discussed above, e.g., the social network entities (101), the optional REST API (102), the social network application (103), the backup agent (104), and the online storage (105). The functions of these components are discussed above. The layout of these components, as shown by this block diagram, is exemplary and non-limiting. Additional configurations within the spirit of the present disclosure are readily apparent. In this figure, a single archive is shown in the form of online storage (105). However, as discussed herein the archive may alternatively be a remote data center, or cloud-based storage. In some preferred aspects, the backup agent (104) will proceed to archive user data immediately or soon after having received user data selected for archiving from the social network application (103). In alternative aspects, the backup agent (104) may be set to transmit data to the selected archive at predetermined intervals, in response to user input or other triggering events. Similarly, the archive proceed need not be limited to a single archive; user data to be archived may be transmitted to multiple archives, together or in succession (e.g., a primary archive and a secondary archive at a different geographic location).

In some exemplary aspects, a system according to the disclosure may comprise two or more social network applications (103), each configured to interact with one or more different social networks through a REST API or an alternative interface. In further aspects, the plurality of social network applications (103) may each be configured to interact with a specific social network. Indeed, it is understood that each of the aspects disclosed herein may be comprise one or a plurality of social network applications (103) based upon the needs of a particular implementation. In some aspects, the social network application (103) may be executed on a user's computer, either as a standalone program, a component of a software package or integrated into a user's web browser. In other aspects, the social network application (103) may be executed on a remote server owned or provided by the social network provider (e.g., with an interface to this program provided to the user via the graphical user interface (GUI) of the social network or exposed as an API for the backup agent (104) to interface with as part of the backup process.

The backup agent (104) may be executed on a user's computer (e.g., on a user's desktop or other local computer) or a remote server (e.g., on a server managed by a cloud-based storage provider). The exemplary system shown in FIG. 1A, illustrates the former configuration, thus it is shown that user data is transmitted from the backup agent (104) to an online storage (105) which in this example is a cloud-based storage. However, in some aspects the backup agent (104) may also exist in the cloud, omitting the intervening step of transferring user data to a user's computer before it is finally sent to the remote online storage (105). The backup agent (104) may further be configured to interact with a plurality of online storage (105) and/or local storage units or locations such that backups may be sent, e.g., to a long-term or short-term storage, or copied to a redundant storage at an alternative location. In some aspects, the particular online storage (105) used for the backup is selected by the user, while in other aspects it is preconfigured in the backup agent (104).

The backup agent (104), as described in detail below, generates an algorithm used by the social network application (103) to request user data from the social network. In many aspects, this algorithm is designed to represent an optimal or efficient process for requesting user data from the social network that takes into account the limitations on external status requests imposed by the social network. For example, a social network may limit the amount of requests received from an external source to N amount of requests in a given unit of time T, or may limit requests to certain categories of user data based on the type of content (e.g., refusing to provide updates regarding photos, or other media but allowing user posts to be reported). An efficient algorithm may request user data that is accessible to the external program (e.g., the social network application (103) or backup agent (104), depending on the implementation) while omitting requests for inaccessible user data. By framing the request in this manner, the algorithm avoids saves bandwidth and time, resulting in conservation of both the user resources, and in some instances, conservation of social network resources (e.g., the social network has fewer invalid requests to respond to when this algorithm is employed).

Social networks may also limit the size of the period in which updates are requested, e.g., limiting an external request to updates that have occurred within the past week or month. An algorithm that accounts for a temporal limitation would also conserve resources for the same reasons as in the previous example. In some aspects, the algorithm may request user data updates that maximizes the number of requests that are permitted within a given amount of time (i.e., N requests in T time, as noted above), resulting in an efficient and potentially optimal solution. In further aspects, the algorithm may take into account multiple limitations, such as those described herein or any other limitations on external requests imposed by a social network, resulting in a more complex algorithm.

In some aspects, the social network application (103) and/or the backup application (104) may be configured to store one or more users' credentials that may be used to access one or more social network accounts associated with the user(s). Similarly, either of these components may be configured to initiate or perform the backup process (or individual steps related thereto) in response to a preset trigger, user input, based on a time parameter, or any other criteria suitable for a desired implementation. For example, the social network application (103) may be configured to alert the backup agent (104) upon a successful sign-in by a user so that a backup can take place. In some aspects, the backup agent (104) may be configured to store a local cache of user data updates so that updates can be transmitted to the online storage (105) periodically or in response to a particular trigger (e.g., when the local cache of user data reaches a particular size threshold).

The methods and systems of the present disclosure provide a solution for backing up data from a social network that, in select aspects, is more efficient and/or secure that proposed solutions known in the art. For example, in select aspects, the disclosed methods take into account export restrictions implemented by a social network so that requests for user data can be presented in an optimal or otherwise more efficient manner (e.g., by minimizing queries to avoid passing a restricted threshold). In other aspects, the methods involve a step of copying the exported user account data to an online storage (e.g., a cloud storage) rather than archiving a local copy on a user's computer. In still further aspects, the methods involve a step wherein user data received from the social network pursuant to a query is compared against a previously received user data set so that new or modified user data can be identified and subsequently transmitted to a remote archive, reducing bandwidth needs and backup time. Aspects of each of these general implementations may be combined or modified, as will be apparent in light of the totality of the disclosure.

Figure 1B:
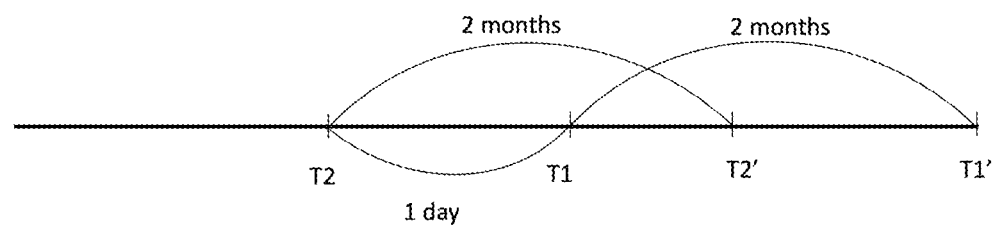
FIG. 1B is a timeline diagram illustrating a process for backing up user data from a social network account according to an exemplary aspect of the disclosure.

FIG. 1B is a timeline diagram illustrating a process for backing up user data from a social network account according to an exemplary aspect of the disclosure. In this diagram, four time points are identified (as T1, T2, T1', T2'). In this illustration, it is understood that the time difference between T2 and T1 is one day and the time difference between T1 and T1' or T2 and T2' is 2 months, respectively.

Figure 2:
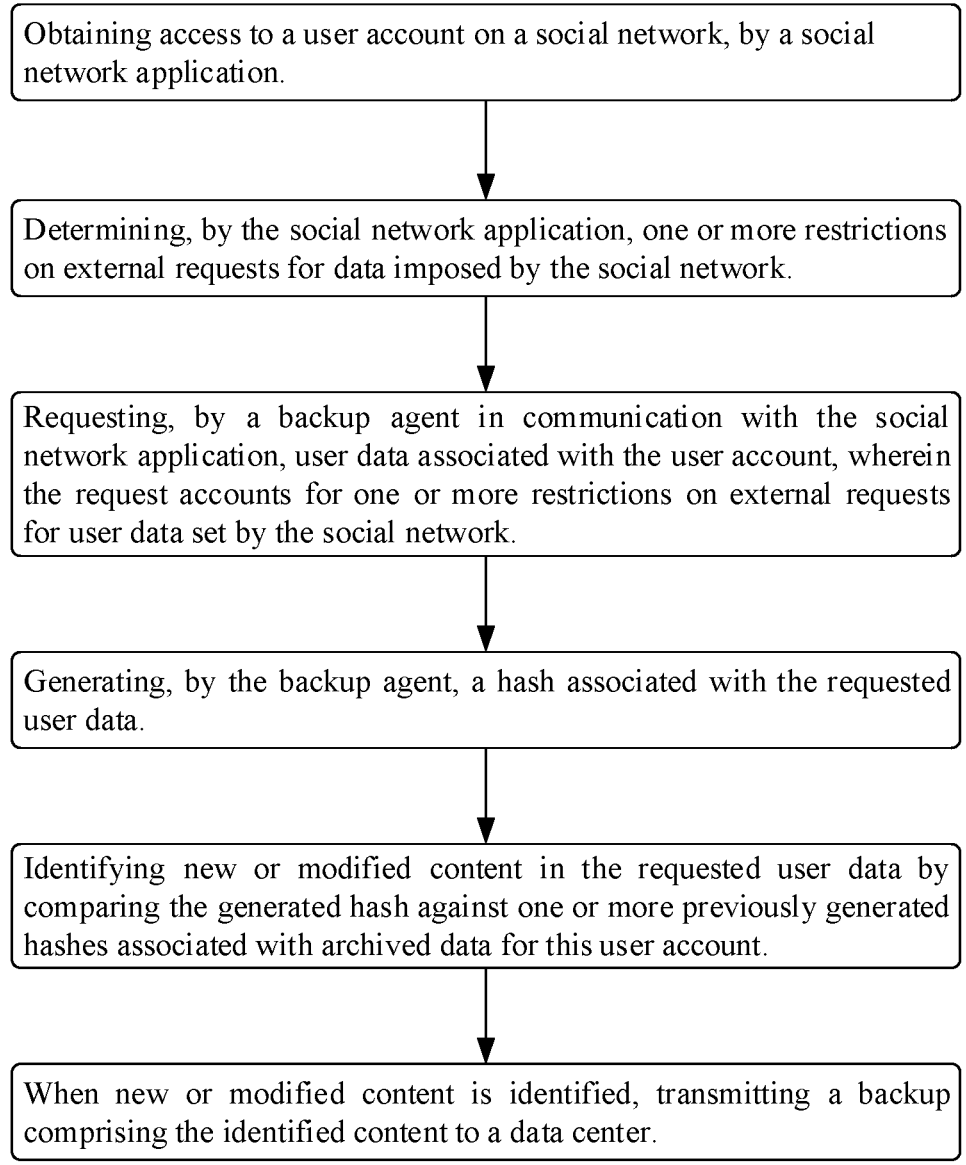
FIG. 2 is a flowchart diagram illustrating an exemplary method for backing up user data from a social network account according to the present disclosure.

FIG. 2 is a flowchart diagram illustrating an exemplary method for backing up user data from a social network account according to the disclosure, and in particularly an illustration of a backup process in accordance with the timeline shown in FIG. 1B. In this exemplary aspect, the backup process is begins with the creation of an initial backup of a segment of a collection of social network content associated with a given user. The duration of this particular segment is 2 months (e.g., T2 to T2') though other durations may be manually or automatically set by a user, a given social network or by the backup allocation. The initial backup of this collection is obtained from the social network by the backup application and then archived locally or to an remote backup archive, and a hash may be generated for this particular backup (i.e., the aforementioned T1 to T1' backup). Thereafter, the backup application may proceed to perform an incremental backup of this user's social network content after a scheduled interval of time (e.g., a backup spanning T2 to T1, which in this example amounts to a 1-day interval). This incremental backup may alternatively be manually authorized by a user or performed in response to a triggering event. In any case, the new or additional content in the collection may then be obtained from the social network by the backup application and a hash may be generated for this incremental backup. The backup application may thus identify new content added each time an incremental backup is collected and also determine whether any past content in the collection has changed or been deleted by comparing the hashes associated with the incremental and full backups each time a backup is obtained. The backup application may then transmit a backup containing the new or modified content to a remote backup archive, avoiding the need for a re-transmission of redundant information (e.g., content that has not changed since archiving). This process may repeat indefinitely, with a new hash generated for each incremental backup (e.g., once a day in this example) and also a new hash generated for each full backup (e.g., once every 2 months in this example).

To reiterate, in this example one such full backup covers the time spanning T1 to T1' (including all of the time identifiers 2 months prior to T1). The next incremental backup occurs 1-day after T1 in this example (i.e., on T2). When performing the backup process for this incremental backup at time point T2, the backup application may generate and/or compare a hash for T1 to T1' with an archived hash for T1 to T1' to determine whether any content in the previously archived collection has been added, deleted or modified, while also backing up any new content added to the collection within the T2 to T1 period (e.g., new content added to a user's feed since the last backup). Typically, users do not make changes to previous posts (or other content) in their feed so the hash comparison will typically indicate that that hashes for the previous period(s) match or otherwise confirm that no changes or deletions have occurred.

While the previous example assumes a 1-day schedule for incremental backups and a 2-month period for full backups, it is understood that either of these parameters are variable and may be set to any duration of time suitable for a desired backup schedule. Moreover, it is understood that the incremental and/or full backup periods may be split into separate parts when calculating hashes in order to provide further time point options for the comparison process. For example, a full backup period may be 2-months and hashes may be calculated for 10 discrete or overlapping segments within this 2-month period. The use of hashes as described above, as well as the calculation of different hashes spanning multiple ranges of time, allows the backup system to efficiently identified new, modified or deleted content in a collection and to minimize the amount of data that needs to be transmitted to a backup archive.

While the previous discussion has focused on collections, as noted above it is understood that each collection comprises one or more objections. Objects consist of two parts, binary content (e.g., an image, text, etc.) and one or more metadata fields associated with the binary content (e.g., a size, time, geotag, description, or other identifiers or attributes). When archiving objects in a collection, the backup application may calculate hashes for each object, sets of objects, and/or one or more metadata fields associated with each object. Moreover, in some exemplary aspects the backup application may be configured to only calculate hashes for identify metadata fields which can be changed (e.g., a "last modified" attribute). In some exemplary aspects, a backup application according to the disclosure may load one or more previous hashes of objects that have been archived and compare hashes for these objects within a collection against the archived hashes to identify changes (e.g., to identify new or modified objects that need to be archived). In many instances the binary content associated with an object cannot be changed and so the backup system may be configured to back up the binary content once and then to reflect any changes in the object in its metadata.

Figure 3:
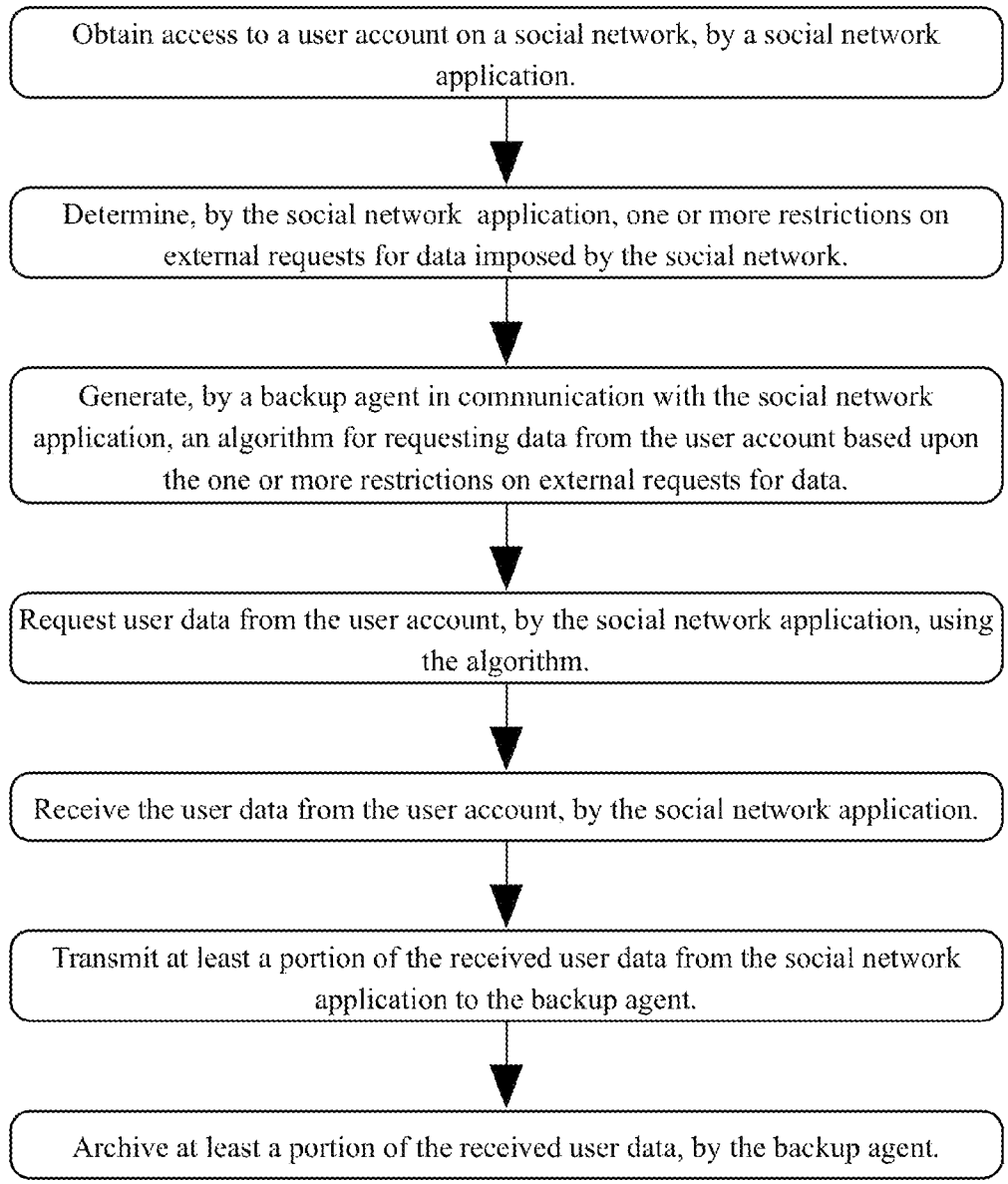
FIG. 3 is a flowchart diagram illustrating an alternative exemplary method for backing up user data from a social network account according to the present disclosure.

FIG. 3 is a flowchart diagram illustrating an exemplary method for backing up user data from a social network account according to the disclosure. The steps of this method are performed by social network application (103) and a backup agent (104), which are illustrated above by FIG. 1A. Social networks contain various forms of user-generated content and information that may be backed up by the present methods (e.g., user information, photos, videos, posts and other structured data). This content and information is organized into various social network entities (101), which vary based upon the nature of the social network. Many social networks organize user data into social network entities (101) at the user, page, group/interest, or event level.

A social network application (103) may interact with and/or monitor one or more social network entities (101) on the social network. As shown by FIG. 1A, in some aspects, this interaction will take place through an API (Application Programming Interface) provided by the social network, such as a REST (REpresentational State Transfer) API. In computing, representational state transfer is an architectural style commonly used for web development. REST consists of a coordinated set of components, connectors, and data elements within a distributed hypermedia system, which are subject to particular constraints required by this architecture style. However, in other aspects that social network application 9103) may interact with the social network through any other interface suitable for detecting and requesting user data updates. In some aspects the social network application (103) is configured to interact with and/or monitor one or more social network entities (101) associated with other user of the social network. For example, after obtaining access to a first user's account, the social network application (103) may be configured to identify one or more secondary users of the social network that are connected to the first user's account through a social relationship recognized by the social network (e.g., friends, colleagues, members of a group). Thereafter, the social network application (103) may interact with and/or monitor the accounts of the identified secondary users so that available user data may be backed up for these secondary accounts, according to the methods described herein.

In many aspects, the social network application (103) will be integrated into a social network (e.g., as an application associated with, installed or otherwise enabled on a user account). However, in some aspects, it may operate as an external program. The social network application (103) may alternatively be external to the social network. In either case, the social network application (103) must obtain access to a user account on a social network and be in communication with a backup agent (104), which is external to the social network. The social network application (103) is configured to determine one or more restrictions on external requests for data that may be imposed by the social network. Such restrictions may include limitations on the number of requests that may be received from a given external source within a particular unit of time, limitations on content types that may be exported, and any other restrictions that may be in place on current social networks. Information regarding the restrictions in effect is communicated from the social network application (103) to the backup agent (104).

Figure 4:
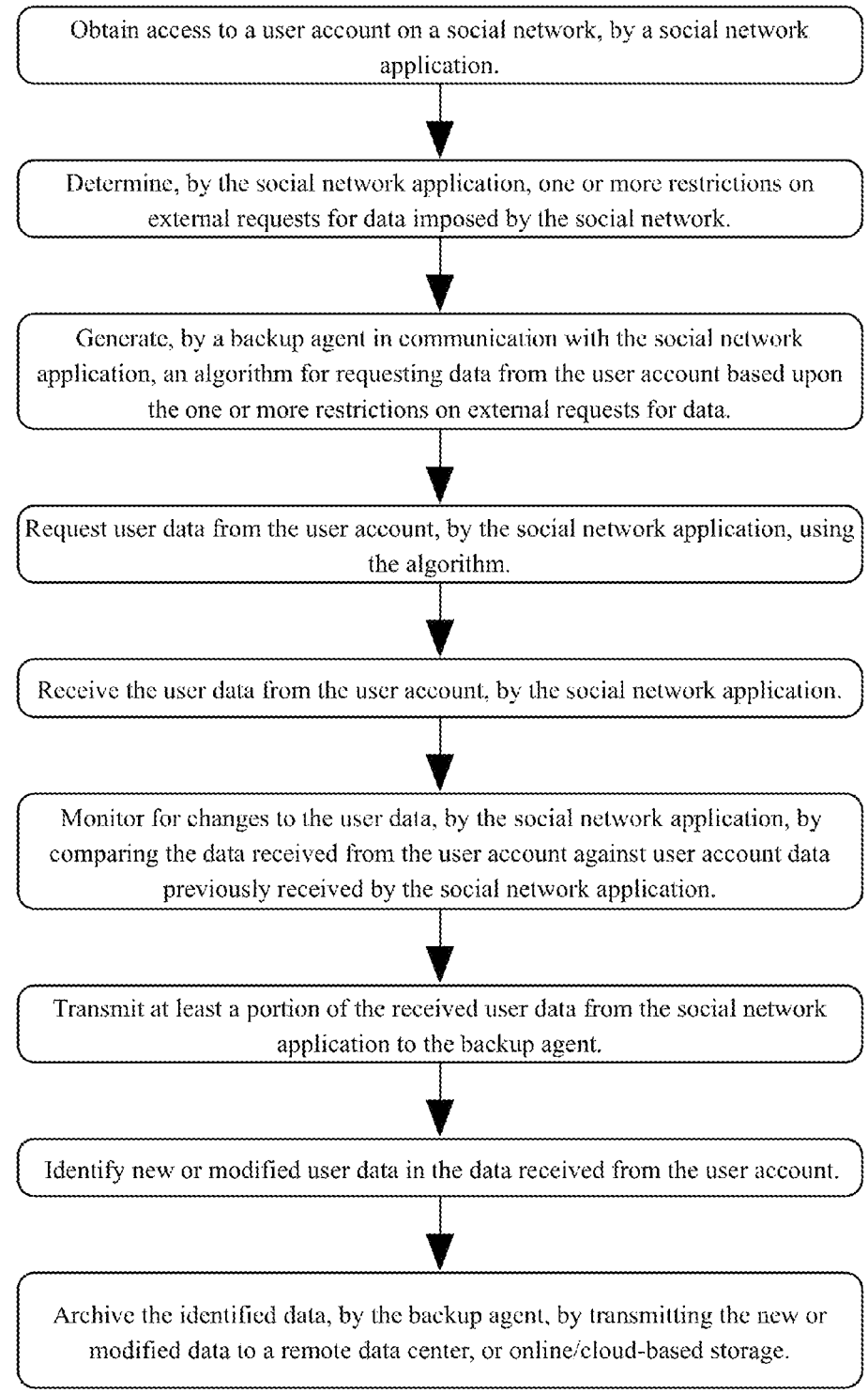
FIG. 4 is a flowchart diagram illustrating an alternative exemplary method for backing up user data from a social network account according to the present disclosure.

The backup agent (104) may then generate an efficient (or optimal) algorithm for requesting data from the user account based upon the one or more restrictions on external requests for data, which may then be used by the social network application to request user data. User data received in response to the query may be transmitted, in whole or in part, from the social network application (103) to the backup agent (104). At this stage, the backup agent (104) will typically archive the data by transmitting a copy to one or more remote data centers, or online/cloud storage. Storage of a remote copy is preferable to local storage, as it reduces the possibility for loss, corruption or theft of data from the user's local computer. The archived user data may be recovered by the user, and in some aspects may be viewable through a GUI. In some aspects, the archive may be exportable in a format compatible with the original (or a different) social network for subsequent importation, FIG. 4 is a flowchart diagram illustrating an alternative exemplary method for backing up user data from a social network account according to the disclosure. In this aspect, the social network application (103) is shown performing an additional filtering process. The social network application (103) may monitor for changes to the user data, by comparing the data received from the user account against user account data previously received by the social network application (103); and identify new or modified user data in the data received from the user account. The new or modified user data may then be selected for transmission to the backup agent (104) and subsequently to the archive. Implementing this step avoids the need for a redundant transmission of user data that was already archived, reducing the size of the transmission and bandwidth needs and resulting in a generally more efficient backup process. In some aspects, the comparison may be performed by comparing the user data received by the social network application (103) to user data that was received within a preselected time interval or threshold. For example, the social network application (103) may be set to compare the user data to user data received within the past day, week, or month as a temporal cut-off, with changes compared to earlier user data sets from prior to the cut-off being ignored. The social network application (103) may timestamp user data received from the social network in order to track changes and potentially to maintain revision information (e.g., so that the archive of user data can be rolled back selectively to one or more earlier timepoints). In other aspects, the comparison may be against the last set of user data received by the social network application (103), against an initial set of user data received by the social network application (103), or using any other criteria or parameter useful for a given implementation.

As illustrated by the exemplary aspects discussed above, the present disclosure provides various methods and systems for implementing a backup agent configured to comply with social network requirements (e.g., with limitations on the number of requests per time unit), allowing users to backup social network content without the risk of interruptions caused by a failure to comply with the backup policies enforced by the social network(s). Moreover, the backup process may be further optimized using hashes comparisons to quickly check for any changes and backup only the updated collections or objects, reducing backup times generally and data transmission, providing an additional benefit to users and to data backup services.

Figure 5:
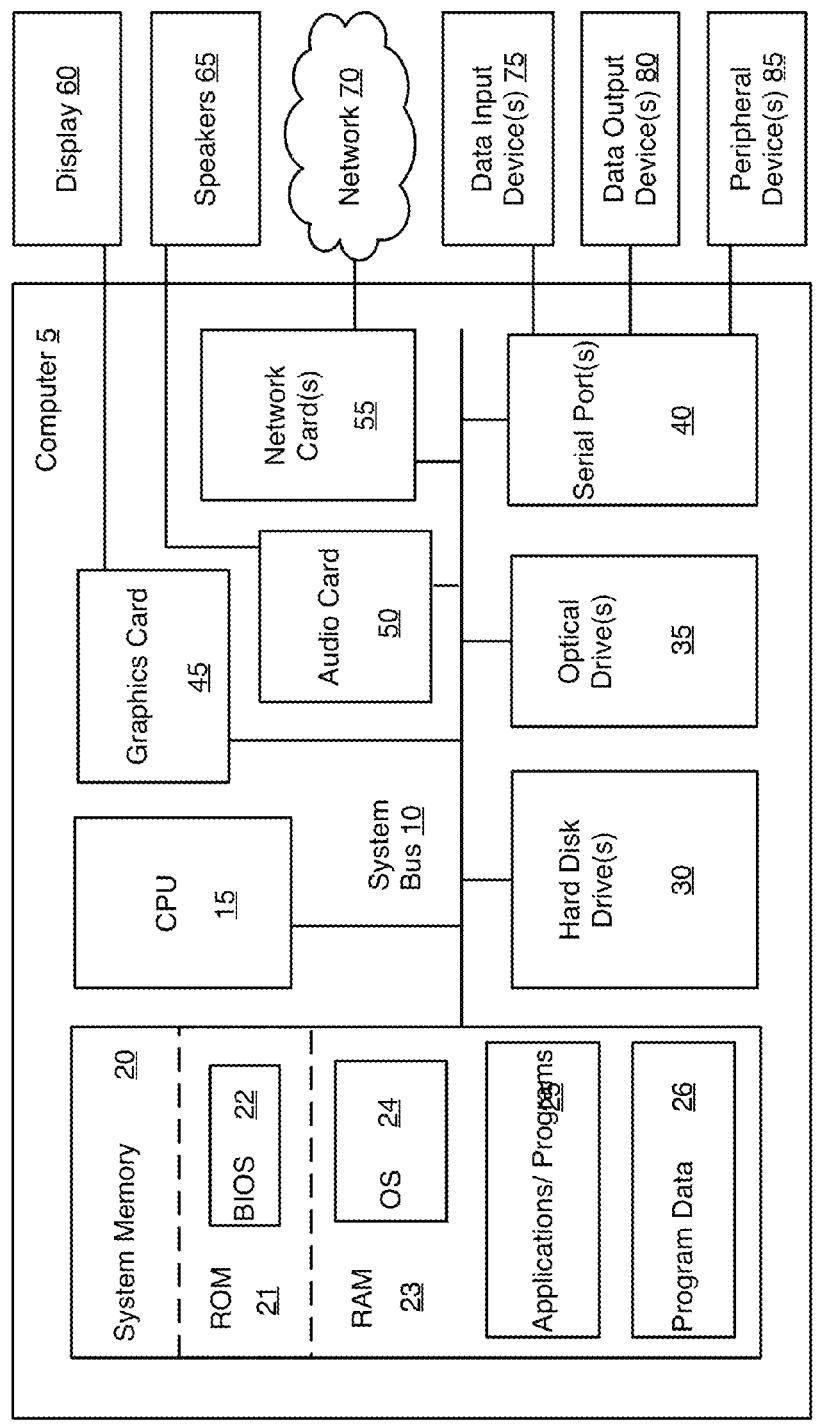
FIG. 5 is a block diagram illustrating an example general-purpose computer system on which the systems and methods for backing up user data from a social network account may be implemented.

FIG. 5 depicts an exemplary aspect of a computer system 5 that may be used to implement the disclosed systems and methods for controlling access to operating system resources. The computer system 5 may include, but not limited to, a personal computer, a notebook, tablet computer, a smart phone, a mobile device, a network server, a router, or other type of processing device. As shown, computer system 5 may include one or more hardware processors 15, memory 20, one or more hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include one or more Intel® Core 2 Quad 2.33 GHz processors or other type of microprocessor.

System memory 20 may include a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the modules of computer system 5, such as during start-up. RAM 23 stores operating system 24 (OS), such as Windows® 7 Professional or other type of operating system, that is responsible for management and coordination of processes and allocation and sharing of hardware resources in computer system 5. Memory 20 also stores applications and programs 25. Memory 20 also stores various runtime data 26 used by programs 25.

Computer system 5 may further include hard disk drive(s) 30, such as SATA HDD, and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMs, ROMs, EPROMs and other types of memory may also be used in alternative aspects of the computer system 5.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. System 5 may also include graphics card 45, such as nVidia® GeForce® GT 240M or other video card, for interfacing with a display 60 or other video reproduction device, such as touch-screen display. System 5 may also include an audio card 50 for reproducing sound via internal or external speakers 65. In addition, system 5 may include network card(s) 55, such as Ethernet, WiFi, GSM, Bluetooth or other wired, wireless, or cellular network interface for connecting computer system 5 to network 70, such as the Internet.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the invention, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for backing up user data from a social network account, comprising:
   obtaining access to a user account on a social network, by a social network application;
   determining, by the social network application, one or more restrictions on external requests for data imposed by the social network, wherein the one or more restrictions indicate a limit on a number of data requests that can be made within a given unit of time;
   generating, by a backup agent in communication with the social network application, an algorithm for requesting data from the user account based upon the one or more restrictions on external requests for data, wherein the algorithm determines a number of requests, less than the limit, that both maximizes an amount of data retrieved and conserves bandwidth and time associated with data retrieval;
   requesting user data from the user account, by the social network application, using the algorithm;
   receiving the user data from the user account, by the social network application;
   transmitting at least a portion of the received user data from the social network application to the backup agent; and
   archiving at least a portion of the received user data, by the backup agent.

2. The method of claim 1, wherein the step of archiving the at least a portion of the received user data, by the backup agent, comprises:
   transmitting a copy of the at least a portion of the received user data, from the backup agent to an online storage comprising a remote data center or a cloud storage.

3. The method of claim 1, wherein the social network application is an application integrated into the user account on the social network.

4. The method of claim 1, wherein the one or more restrictions on external requests for data comprise at least one of the following:
   a) a limitation on the type of user data that may be requested; or
   b) a limitation on requests for user data based upon a privacy level associated with the data.

5. The method of claim 1, further comprising the following steps:
   monitoring for changes to the user data, by the social network application, by comparing the data received from the user account against user account data previously received by the social network application; and
   identifying new or modified user data in the data received from the user account.

6. The method of claim 5, wherein the previously received user account data used for the comparison is selected based upon a preset timeframe parameter.

7. The method of claim 5, wherein the new or modified user data is transmitted from the social network application to the backup agent and archived by the backup agent.

8. The method of claim 5, wherein the new or modified data is identified by:
   generating a hash associated with the data received from the user account;
   comparing the hash against one or more hashes generated for user account data previously received and/or archived by the social network application.

9. The method of claim 8, wherein the at least a portion of the received user data archived by the backup agent comprises the new or modified data and excludes user data that has previously been archived.

10. A system for backing up user data from a social network account, comprising:
    a hardware processor configured to:
       obtain access to a user account on a social network, by a social network application;
       determine, by the social network application, one or more restrictions on external requests for data imposed by the social network, wherein the one or more restrictions indicate a limit on a number of data requests that can be made within a given unit of time;
       generate, by a backup agent in communication with the social network application, an algorithm for requesting data from the user account based upon the one or more restrictions on external requests for data, wherein the algorithm determines a number of requests, less than the limit, that both maximizes an amount of data retrieved and conserves bandwidth and time associated with data retrieval;

request user data from the user account, by the social network application, using the algorithm;

receive the user data from the user account, by the social network application;

transmit at least a portion of the received user data from the social network application to the backup agent; and archive at least a portion of the received user data, by the backup agent.

11. The system of claim 10, wherein the processor is further configured to archive the at least a portion of the received user data, by the backup agent, by transmitting a copy of the at least a portion of the received user data, from the backup agent to an online storage comprising a remote data center or a cloud storage.

12. The system of claim 10, wherein the social network application is an application integrated into the user account on the social network.

13. The system of claim 10, wherein the one or more restrictions on external requests for data comprise at least one of the following:
   a) a limitation on the type of user data that may be requested; or
   b) a limitation on requests for user data based upon a privacy level associated with the data.

14. The system of claim 8, wherein the processor is further configured to:
   monitor for changes to the user data, by the social network application, by comparing the data received from the user account against user account data previously received by the social network application; and
   identify new or modified user data in the data received from the user account.

15. The system of claim 14, wherein the previously received user account data used for the comparison is selected based upon a preset timeframe parameter.

16. The system of claim 14, wherein the new or modified user data is transmitted from the social network application to the backup agent and archived by the backup agent.

17. The method of claim 14, wherein the new or modified data is identified by:
   generating a hash associated with the data received from the user account;
   comparing the hash against one or more hashes generated for user account data previously received and/or archived by the social network application.

18. The method of claim 17, wherein the at least a portion of the received user data archived by the backup agent comprises the new or modified data and excludes user data that has previously been archived.

19. A non-transitory computer readable medium storing computer-executable program instructions for backing up user data from a social network account, including instructions for:

obtaining access to a user account on a social network, by a social network application;

determining, by the social network application, one or more restrictions on external requests for data imposed by the social network, wherein the one or more restrictions indicate a limit on a number of data requests that can be made within a given unit of time;

generating, by a backup agent in communication with the social network application, an algorithm for requesting data from the user account based upon the one or more restrictions on external requests for data, wherein the algorithm determines a number of requests, less than the limit, that both maximizes an amount of data retrieved and conserves bandwidth and time associated with data retrieval;

requesting user data from the user account, by the social network application, using the algorithm;

receiving the user data from the user account, by the social network application;

transmitting at least a portion of the received user data from the social network application to the backup agent; and archiving at least a portion of the received user data, by the backup agent.

20. The method of claim 1, wherein generating the algorithm for requesting data from the user account based upon the one or more restrictions on external requests for data comprises:

determining that the one or more restrictions prevent user data of a first type from being requested from the social network;

identifying, on the social network, user data of a second type that is not of the first type; and generating the algorithm for requesting data, wherein the algorithm requests the user data of the second type and does not request the user data of the first type.

* * * * *